(12) United States Patent
Desperben et al.

(10) Patent No.: US 7,702,042 B2
(45) Date of Patent: Apr. 20, 2010

(54) ARRANGEMENT AND METHOD FOR ITERATIVE CHANNEL IMPULSE RESPONSE ESTIMATION

(75) Inventors: Lydie Desperben, Toulouse (FR); Mathieu Villion, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 940 days.

(21) Appl. No.: 10/520,067

(22) PCT Filed: Jun. 25, 2003

(86) PCT No.: PCT/EP03/06751

§ 371 (c)(1),
(2), (4) Date: Sep. 12, 2005

(87) PCT Pub. No.: WO2004/006522

PCT Pub. Date: Jan. 15, 2004

(65) Prior Publication Data

US 2006/0088135 A1    Apr. 27, 2006

(30) Foreign Application Priority Data

Jul. 3, 2002    (EP) .................................. 02291658

(51) Int. Cl.
*H04L 27/06*    (2006.01)
(52) U.S. Cl. ..................................................... 375/340
(58) Field of Classification Search .................. 375/224, 375/227, 340, 349, 350, 316, 230, 232, 355; 455/67.13, 69, 273, 275
See application file for complete search history.

(56) References Cited

U.S. PATENT DOCUMENTS 5,432,816 A * 7/1995 Gozzo ........................ 375/232

(Continued)

FOREIGN PATENT DOCUMENTS

CN    1346187 A    4/2002

(Continued)

OTHER PUBLICATIONS

International Search Report and Written Opinion correlating to EP 02 29 1658, dated Oct. 17, 2003.

(Continued)

*Primary Examiner*—Chieh M Fan
*Assistant Examiner*—Jaison Joseph

(57) ABSTRACT

An arrangement (300) and method, for iterative channel impulse response estimation in a system such as a GSM/EDGE system employing a transmission channel, by: producing (310) from a received signal (y) a channel impulse response estimate signal (p); and producing (320) from the received signal (y) a noise estimate signal (w) which is iteratively fed back to improve the channel impulse response estimate signal (p). The noise estimate signal comprises a matrix (w) respresenting the inverse of noise covariance; the matrix may be calculated at each iteration or may be selected from predetermined values corresponding to statistics of expected noise. This provides the advantages of reduced complexity, independence of the equalization method used to produce the channel impulse response estimate signal, and consequent performance improvement.

18 Claims, 2 Drawing Sheets

U.S. PATENT DOCUMENTS

| | | | |
|---|---|---|---|
| 6,459,728 B1 * | 10/2002 | Bar-David et al. | 375/231 |
| 6,674,820 B1 * | 1/2004 | Hui et al. | 375/346 |
| 7,024,163 B1 * | 4/2006 | Barratt et al. | 455/69 |
| 7,062,227 B2 * | 6/2006 | Chevalier et al. | 455/67.13 |
| 7,203,257 B2 * | 4/2007 | Fimoff et al. | 375/343 |
| 7,305,050 B2 * | 12/2007 | Krupka | 375/340 |
| 2002/0024994 A1 * | 2/2002 | Piirainen et al. | 375/231 |
| 2003/0210752 A1 * | 11/2003 | Krupka | 375/340 |
| 2004/0247061 A1 * | 12/2004 | Matsumoto et al. | 375/346 |

FOREIGN PATENT DOCUMENTS

| | | | |
|---|---|---|---|
| EP | 1128617 A1 * | 8/2001 | |
| WO | WO 01/61950 A1 | 8/2001 | |

OTHER PUBLICATIONS

Application No. 02291658.9, EPC Office Action—Rejection, dated Jan. 18, 2005.
Application No. 02291658.9, EPC Office Action—Rejection, dated Oct. 12, 2005.
Application No. 02291658.9, EPC Office Action—Rejection, dated Oct. 4, 2006.
Application No. 03815843.4, China Office Action—English Translation—Rejection, dated Nov. 7, 2008.
Sandell, M., et al., "Iterative Channel Estimation Using Soft Decision Feedback", Global Telecommunications Conference, 1998, Globecome 1998, The Bridge to Global Integration, IEEE, vol. 6, 1998, pp. 3728-3733.

\* cited by examiner

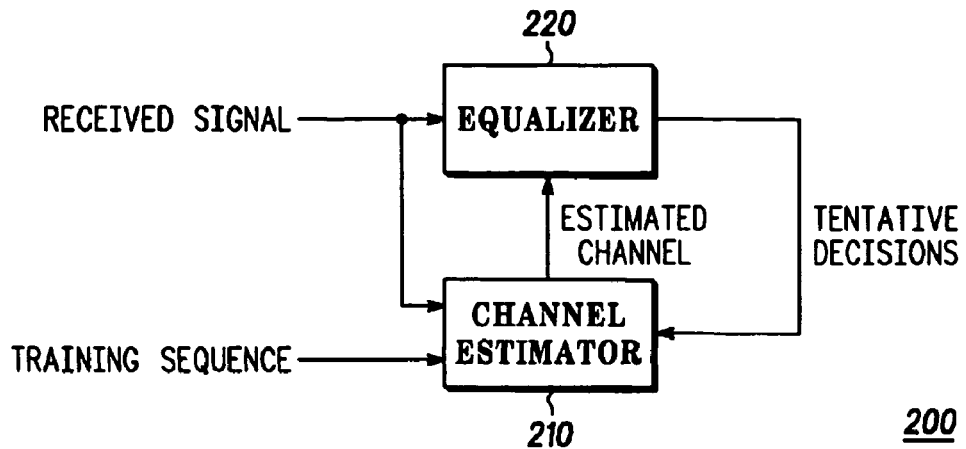
*- PRIOR ART -* FIG. 2
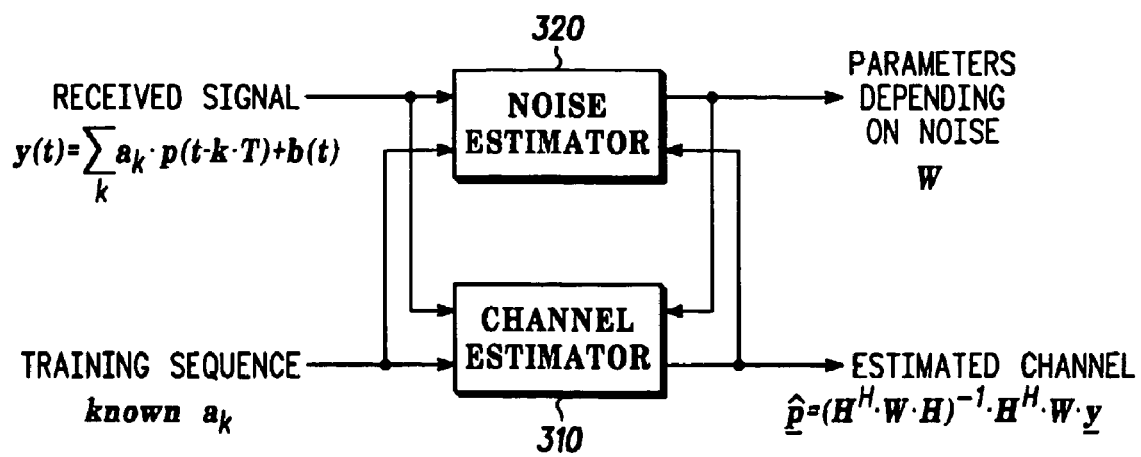
FIG. 3

ARRANGEMENT AND METHOD FOR ITERATIVE CHANNEL IMPULSE RESPONSE ESTIMATION

FIELD OF THE INVENTION

This invention relates to systems employing transmission channels, and particularly (though not exclusively) to wireless cellular telecommunication systems.

BACKGROUND OF THE INVENTION

In the field of this invention it is known that the receiver performance in wireless cellular telecommunication systems relies on the estimate of the impulse response of the overall channel which includes the transmitter pulse, the radio channel, and the receiver selectivity filtering.

From the publication "Iterative channel estimation using soft decision feedback", by Magnus Sandell et al., Global Telecommunications Conference, 1998. GLOBECOM 1998. The Bridge to Global Integration. IEEE, Volume: 6, 1998, pp. 3728-3733, iterative channel impulse response estimation is known using soft decision feedback. In this known technique, channel impulse response estimation is improved through an iterative process which increases the number of known symbols in a received modulated signal by iteratively feeding back successive tentative decisions from an equaliser to a channel impulse response estimator.

However, this approach has the disadvantage that a great part of the complexity of the technique depends on the complexity of the equalizer, which may dramatically increase with the number of points in the modulation constellation.

A need therefore exists for iterative channel impulse response estimation using noise estimate wherein the above-mentioned disadvantage may be alleviated.

Patent specification WO 01/61950 describes a method channel impulse response estimation using whitening filters in the noise estimate. In this method, a plurality of channel impulse response and noise sample estimates are needed for each iteration and the whitening filters introduce delay and added complexity.

STATEMENT OF INVENTION

The present invention provides an arrangement and a method for iterative channel impulse response estimation as described in the accompanying claims.

BRIEF DESCRIPTION OF THE DRAWINGS

One arrangement and method for iterative channel impulse response estimation using noise estimate incorporating the present invention will now be described, by way of example only, with reference to the accompanying drawings, in which:

FIG. 2 shows a prior art receiver arrangement for iterative channel impulse response estimation; and FIG. 3 shows a receiver arrangement for iterative channel impulse response estimation incorporating the present invention.

DESCRIPTION OF PREFERRED EMBODIMENT

Figure 1:
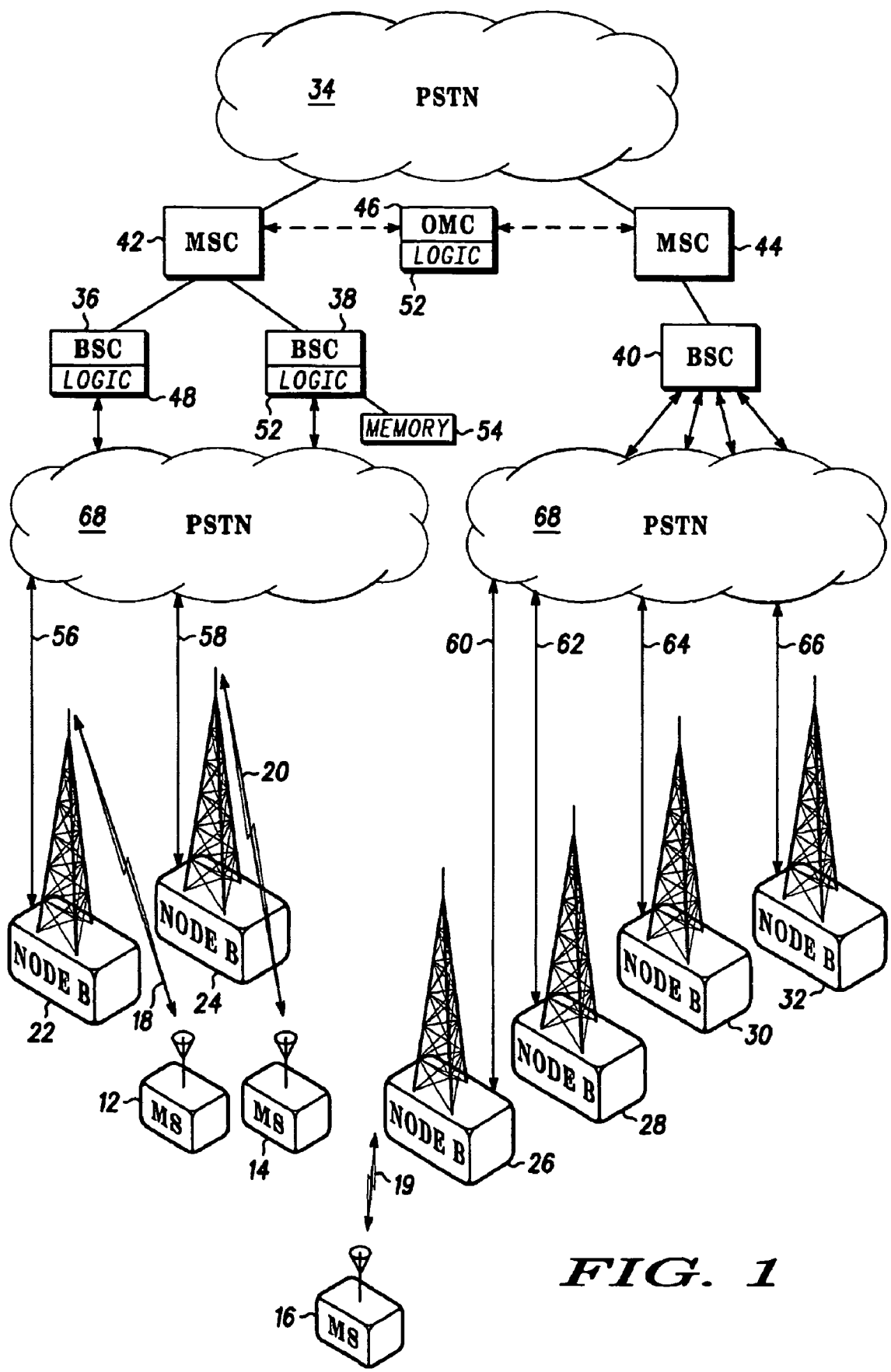
FIG. 1 shows a prior art arrangement for iterative channel impulse response estimation.

FIG. 1 shows, in outline, a GSM/EDGE ("Groupe Spéciale Mobile" or General System for Mobile communications/Enhanced Data rates for GSM Evolution) wireless cellular telephone communication system 10 in which the present invention may be used.

Generally, the system's air-interface protocol is administered from base transceiver sites that are geographically spaced apart—one base site supporting a cell (or, for example, sectors of a cell).

A plurality of subscriber units (MSs) 12-16 communicate over the selected air-interface 18-20 with a plurality of base transceiver stations (BTSs) 22-32. A limited number of MSs 12-16 and BTSs 22-32 are shown for clarity purposes only. The BTSs 22-32 may be connected to a conventional public-switched telephone network (PSTN) 34 through base station controllers (BSCs) 36-40 and mobile switching centres (MSCs) 42-44.

Each BTS 22-32 is principally designed to serve its primary cell, with each BTS 22-32 containing one or more transceiver units and communicating 56-66 with the rest of the cellular system infrastructure Each Base Station Controller (BSC) 36-40 may control one or more BTSs 22-32, with BSCs 36-40 generally interconnected through MSCs 42-44.

Each MSC 42-44 provides a gateway to the PSTN 34, with MSCs 42-44 interconnected through an operations and management centre (OMC) 46 that administers general control of the cellular telephone communication system 10, as will be understood by those skilled in the art.

The various system elements, such as BSCs 36-38 and OMC 46, will include control logic 48, 50, 52, with the various system elements usually having an associated memory function 54 (shown only in relation to BSC 38 for the sake of clarity). The memory function 54 typically stores historically compiled operational data as well as in-call data, system information and control algorithms.

In each MS, receiver performance relies on an estimate of the impulse response of the overall channel which includes the transmitter pulse, the radio channel, and the receiver selectivity filtering.

Assuming the use of linear or quasi-linear modulations, the complex base band received signal may be represented as:

$$y(t) = \sum_k a_k \cdot p(t - k \cdot T) + b(t)$$

where $\{a_k\}$ is the original transmitted symbol sequence, p(t) represents the complex impulse response of the overall channel and b(t) is the unwanted signal, called noise (filtered Gaussian noise, interferers such as upper adjacent interferer, lower adjacent interferer, co-channel interferer, etc.).

The Weighted Least Square algorithm provides for an estimate $\hat{p}(t)$ of p(t) which minimizes the mean squared distance between $\hat{p}(t)$ and p(t). Working with sampled signals, the generic equation is:

$$\underline{\hat{p}} = (H^H \cdot W \cdot H)^{-1} \cdot H^H \cdot W \cdot \underline{y}$$

where:

$\underline{\hat{p}}$ is the vector of $L_p$ estimated samples of the overall channel.

$\underline{y}$ is the vector of $L_y$ received samples corresponding to the sequence of known symbols.

H is a $\lfloor L_y, L_p \rfloor$ matrix depending on known symbols

W is a $\lfloor L_y, L_y \rfloor$ weighting matrix representing the inverse of the noise covariance.

There is no a priori knowledge on the statistical properties of the noise which evolves according to the position of a mobile station within a cell, according to the number of users, and according to the frequency channel in case of frequency hopping. In most of existing implementations, W is constant to the benefit of a specific noise (filtered Gaussian noise for instance) or of less complexity when W is equal to the identity matrix (white Gaussian noise).

Referring now to FIG. 2, a known arrangement 200 for deriving a channel impulse response estimate in a receiver such as MSs 12-16 uses a channel impulse response estimator 210 and an equalizer 220. A received signal is applied to both the equalizer and to the channel impulse response estimator, which is initially trained with a predetermined training sequence. The channel impulse response estimator 210 produces an estimated channel signal which is applied to the equalizer 220, where it is used to produce a tentative decision for modulated symbols in the received signal. The tentative decisions are iteratively fed back to the channel impulse response estimator 210, to modify estimated channel signal so as to improve the tentative symbol decisions.

However, this known approach has the disadvantage that a great part of the complexity of the technique depends on the complexity of the equalizer 220, which may dramatically increase with the number of points in the modulation constellation.

Referring now to FIG. 3, an arrangement 300 for improving the quality of the overall channel impulse response estimate for use in a receiver such as MSs 12-16 includes a channel impulse response estimator 310 (known per se) and a noise estimator 320 (whose function will be described in more detail below). A received signal is applied to both the channel impulse response estimator 310 and to the noise estimator 320; both the channel impulse response estimator 310 and the noise estimator 320 are initially trained with a predetermined training sequence. The channel impulse response estimator 310 produces an estimated channel signal which is applied to the noise estimator 320 and to a further stages such as an equalizer (not shown) where it is used to produce decisions for modulated symbols in the received signal. The noise estimator 320 produces parameters depending on noise in the received signal; these parameters are applied to further stages (not shown) and are also fed back to the channel impulse response estimator 310, to modify the estimated channel signal so as to improve symbol decisions.

In this technique, channel impulse response estimation is done by iterations. Each iteration provides updated knowledge about statistical properties of the noise and updated channel impulse response estimate. A first estimate of the channel is fed to the noise estimator 320 which estimates the noise parameters which are then provided to the channel impulse response estimator which estimates the channel and so on.

The sequence of operations of the method is detailed below:

Initialisation

The first estimate of the channel impulse response $\underline{p(0)}$ can be computed by using an a priori weighting matrix or by using a correlation method which is widely used for GSM training sequences Iteration K for K>0

The vector of noise samples $\underline{b(K)}$ is given by:

$$\underline{b(K)} = \underline{y} - H \cdot \underline{p(K-1)}$$

Then $\underline{r(K)}$, the vector of L, noise covariance taps, is computed from the estimated noise samples:

$$\underline{r(K)} = win_k \cdot \sum_{l=k}^{L_y-1} b_l(K) \cdot b_{l-k}(K)^*$$

where $win_k$ is a windowing function with a positive Fourier transform.

Then the new channel impulse response estimate is given by:

$$\underline{p(K)} = (H^H \cdot W(K) \cdot H)^{-1} \cdot H^H \cdot W(K) \cdot \underline{y}$$

where W(K) is the new weighting matrix.

For the computation of equation members including W(K), two modes of computation are possible:
- mode A: on the fly.
- mode B: precomputed values which correspond to the statistics of the expected noises (e.g., Gaussian noise, upper adjacent interferer noise, lower adjacent interferer noise, or co-channel interferer noise).

In mode A, the $\lfloor L_y, L_y \rfloor$ matrix W(K) is given by:

$$W(K) = \begin{bmatrix} r_0(K) & r_1(K) & \ldots & r_{L_y-1}(K) & 0 & \ldots & 0 \\ r_1(K)^* & r_0(K) & \ldots & r_{L_y-2}(K) & r_{L_y-1}(K) & \ldots & 0 \\ \ldots & \ldots & \ldots & \ldots & \ldots & \ldots & \ldots \\ r_{L_y-1}(K)^* & r_{L_y-2}(K)^* & \ldots & \ldots & \ldots & \ldots & \ldots \\ 0 & r_{L_y-1}(K)^* & r_{L_y-2}(K)^* & \ldots & \ldots & \ldots & \ldots \\ \ldots & \ldots & \ldots & \ldots & \ldots & \ldots & r_1(K) \\ 0 & 0 & 0 & \ldots & \ldots & r_1(K)^* & r_0(k) \end{bmatrix}^{-1}$$

In mode B, the vector $\underline{r(K)}$ is compared with a set of N, expected vectors $\underline{r^M}$ and the $\lfloor L_y, L_y \rfloor$ matrix W(K) is given by:

$$W(K) = W^{M_{opt}} = \begin{bmatrix} r_0^{M_{opt}} & r_1^{M_{opt}} & \ldots & r_{L_y-1}^{M_{opt}} & 0 & \ldots & 0 \\ r_1^{M_{opt}*} & r_0^{M_{opt}} & \ldots & r_{L_y-2}^{M_{opt}} & r_{L_y-1}^{M_{opt}} & \ldots & 0 \\ \ldots & \ldots & \ldots & \ldots & \ldots & \ldots & \ldots \\ r_{L_y-1}^{M_{opt}*} & r_{L_y-2}^{M_{opt}*} & \ldots & \ldots & \ldots & \ldots & \ldots \\ 0 & r_{L_y-1}^{M_{opt}*} & r_{L_y-2}^{M_{opt}*} & \ldots & \ldots & \ldots & \ldots \\ \ldots & \ldots & \ldots & \ldots & \ldots & \ldots & r_1^{M_{opt}} \\ 0 & 0 & 0 & \ldots & \ldots & r_1^{M_{opt}*} & r_0^{M_{opt}} \end{bmatrix}^{-1}$$

where $M_{opt}$ is the index of the vector which minimizes the distance between r(K) and $\underline{r}^M$.

It will be understood that the technique for iterative channel impulse response estimation using noise estimate described above provides the following advantages:

Less complexity;

Independence of the particular equalization method; and

Consequent performance improvement (tests have shown that use of this technique in a EDGE system can result in a performance improvement of 1.8 dB).

It will be understood that, if desired, the technique for iterative channel impulse response estimation using noise estimate described above could be with the prior art technique of FIG. 2.

It will also be understood that, although the technique for iterative channel impulse response estimation using noise estimate has been described above in relation to the receiver in a mobile station (MS), the technique could also be applied to the receiver in a base station (BTS).

It will be appreciated that the method described above for iterative channel impulse response estimation using noise estimate will typically be carried out in software running on a processor (not shown), and that the software may be provided as a computer program element carried on any suitable data carrier (also not shown) such as a magnetic or optical computer disc.

It will also be appreciated that various modifications to the embodiment described above will be apparent to a person of ordinary skill in the art.

The invention claimed is:

1. An arrangement for iterative channel impulse response estimation in a system employing a transmission channel, comprising:

a channel impulse response estimator for producing iteratively from a received signal (y) a channel impulse response estimate ($\hat{p}$); and a noise estimator for producing from the received signal (y) iteratively at each iteration K an estimated vector of noise samples $\underline{b}(K)=\underline{y}-H\cdot\hat{p}(K-1)$, where H is a matrix depending on known symbols, computing from the estimated vector of noise samples a vector of noise covariance taps $$\underline{r}(K) = win_k \cdot \sum_{l=k}^{L_y-1} b_l(K) \cdot b_{l-k}(K)^*$$

where $win_k$ is a windowing function with a positive Fourier transform, and using the vector r(K) to produce a new matrix W(K) representing the inverse of noise covariance, and said channel impulse response estimator is arranged, at each iteration (K), to respond to said new matrix W(K) representing the inverse of noise covariance to produce a single improved channel impulse response estimate $\hat{p}(K)=(H^H\cdot W(K)\cdot H)^{-1}\cdot H^H\cdot W(K)\cdot\underline{y}$.

2. The arrangement of claim 1 wherein said new matrix W(K) representing the inverse of noise covariance is calculated at each iteration.

3. The arrangement of claim 1 wherein said new matrix W(K) representing the inverse of noise covariance is selected from predetermined values corresponding to statistics of expected noise.

4. The arrangement of claim 3 wherein the predetermined values corresponding to statistics of expected noise are selected according to the noise types: Gaussian, upper adjacent interferer, lower adjacent interferer, or co-channel interferer.

5. The arrangement of claim 1 wherein the channel impulse response estimator is arranged to produce the channel impulse response estimate ($\hat{p}$) as a weighted least square function.

6. The arrangement of claim 1 wherein the system is a wireless communication system.

7. The arrangement of claim 6 wherein the system is a GSM system.

8. The arrangement of claim 7 wherein the system is an EDGE system.

9. A receiver for use in a system employing a transmission channel, the receiver comprising the arrangement of claim 1.

10. A method for iterative channel impulse response estimation in a system employing a transmission channel, comprising:

providing a channel impulse response estimator for producing iteratively from a received signal (y) a channel impulse response estimate ($\hat{p}$); and providing a noise estimator for producing from the received signal (y) iteratively at each iteration K an estimated vector of noise samples $\underline{b}(K)=\underline{y}\cdot H\cdot\hat{p}(K-1)$, where H is a matrix depending on known symbols, computing from the estimated vector of noise samples a vector of noise covariance taps $$\underline{r}(K) = win_k \cdot \sum_{l=k}^{L_y-1} b_l(K) \cdot b_{l-k}(K)^*$$

where $win_k$ is a windowing function with a positive Fourier transform, and using the vector r(K) to produce a new matrix W(K) representing the inverse of noise covariance, and said channel impulse response estimator, at each iteration (K), responds to said new matrix W(K) representing the inverse of noise covariance to produce a single improved channel impulse response estimate $\hat{p}(K)=(H^H\cdot W(K)\cdot H)^{-1}\cdot H^H\cdot W(K)\cdot\underline{y}$.

11. The method of claim 10 wherein said new matrix (W(K)) representing the inverse of noise covariance is calculated at each iteration.

12. The method of claim 10 wherein said new matrix representing the inverse of noise covariance is selected from predetermined values corresponding to statistics of expected noise.

13. The arrangement of claim 12 wherein the predetermined values corresponding to statistics of expected noise are selected according to the noise types: Gaussian, upper adjacent interferer, lower adjacent interferer, or co-channel interferer.

14. The method of claim 10 wherein the channel impulse response estimator produces the channel impulse response estimate ($\hat{p}$) as a weighted least square function.

15. The method of claim 10 wherein the system is a wireless communication system.

16. The method of claim 15 wherein the system is a GSM system.

17. The method of claim 15 wherein the system is an EDGE system.

18. A computer readable medium embodying a computer program element, the computer program element comprising instructions for performing a method for iterative channel impulse response estimation in a system employing a transmission channel, the method comprising:

providing a channel impulse response estimator for producing iteratively from a received signal (y) a channel impulse response estimate ($\hat{p}$); and providing a noise estimator for producing from the received signal (y) iteratively at each iteration K an estimated vector of noise samples $\underline{b}(K)=\underline{y}-H\cdot\hat{p}(K-1)$, where H is a matrix depending on known symbols, computing from the estimated vector of noise samples a vector of noise covariance taps $$\underline{r(K)} = win_k \cdot \sum_{l=k}^{L_y-1} b_l(K) \cdot b_{l-k}(K)^*$$

where $win_k$ is a windowing function with a positive Fourier transform, and using the vector $\underline{r(K)}$ to produce
- a new matrix $W(K)$ representing the inverse of noise covariance, and
- said channel impulse response estimator, at each iteration (K), responds to said new matrix $W(K)$ representing the inverse of noise covariance to produce a single improved channel impulse response estimate $\underline{\hat{p}(K)} = (H^H \cdot W(K) \cdot H)^{-1} \cdot H^H \cdot W(K) \cdot \underline{y}$.

* * * * *